United States Patent Office 3,432,323
Patented Mar. 11, 1969

3,432,323
POLYMERIC ORGANIC TITANATE TREATED
TiO₂ PIGMENT
Raymond J. Wigginton, Grimsby, England, assignor to Laporte Titanium Limited, London, England, a British company
No Drawing. Filed Aug. 16, 1965, Ser. No. 480,191
Claims priority, application Great Britain, Aug. 21, 1964, 34,349/64
U.S. Cl. 106—300                4 Claims
Int. Cl. C09c 3/00, 1/36

ABSTRACT OF THE DISCLOSURE

The invention relates to the treatment of pigment particles to render them more readily dispersible in the organic media used in the preparation of paints and lacquers and to impart improved gloss and hiding power characteristics to paints and lacquers containing such treated pigment particles. The treating agents comprise polymeric organic titanium compounds.

---

The present invention relates to the manufacture of pigments having improved properties. More particularly, it relates to processes for contacting titanium dioxide pigment particles with polymeric organic titanium products and to the finished products thereby produced.

The treated titanium dioxide pigments of this invention possess markedly improved dispersibility characteristics in the organic media conventionally used in the preparation of paints and lacquers. Moreover they impart improved gloss and hiding power characteristics to paints and lacquers in which they are incorporated.

The invention also provides an improved paint or lacquer containing the treated pigment of this invention dispersed in an organic paint or lacquer medium.

The term "titanium dioxide pigment particles" is used herein to denote not only the particles of a finished titanium dioxide pigment but also titanium dioxide particles formed at any stage during the manufacture of the pigment.

The polymeric organic titanium products used in this invention are polymeric alkylene glycol titanates of the general formula:

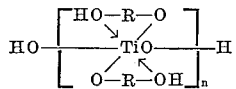

in which $n$ represents a whole number ranging from 5 to 50 and R represents the alkylene radical of an alkylene-diol of the general formula

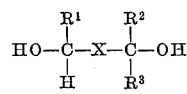

in which $R^1$, $R^2$ and $R^3$ may be the same or different, and each represents a member selected from the group consisting of hydrogen or alkyl radicals, for example, a methyl or ethyl group; and X represents an alkylene group containing 1 to 8 carbon atoms and having a straight or branch chain. The alkylene radical represented by R preferably has from 3 to 10 carbon atoms. The dehydration products of these polymeric alkylene glycol titanates can also be used in this invention.

These polymeric alkylene glycol titanates are the reaction products of a tetra-alkyl titanate containing 2 to 8 carbon atoms per alkyl group, an alkylene-diol and water in the respective molecular ratio 2:4:1. Such a reaction product can be dehydrated by heating it to form a product of which, depending on the intensity of the conditions of dehydration, the degree of dehydration may vary, and which consists of one or more dehydrated compounds or a mixture of the non-dehydrated reaction product with one or more dehydrated compounds. The dehydrated compounds are formed by the progressive removal of molecules of water, up to a maximum of $2n$ molecules, with the consequent formation of a carbon-to-carbon double bond in each radical R in the above general formula.

Examples of polymeric organic titanium products for use in the process include polymeric hexylene glycol titanates in which the value of $n$ in the above formula is 10, 11 or 12, and dehydration products thereof, described in British patent specification No. 975,452. Those titanates are derivatives of 2-methyl-pentan-2,4-diol. Examples of other titanates that may be used in the process of this invention include the corresponding derivatives of 3 - methylpentan - 2,4 - diol; 2-ethylhexan-1, 3 - diol and 3-methylpentan-1,5-diol.

The titanium dioxide pigment particles may be contacted conveniently with the polymeric organic titanium product by mixing the particles with a solution of the product in an organic solvent, for example, perchlorethylene, xylene or butanol.

Instead of using a solution of a preformed polymeric alkylene glycol titanate, a solution of the corresponding dialkyl bis-(alkylene glycol) titanate (the reaction product of 1 molecular proportion of a tetra-alkyl titanate with 2 molecular proportions of an alkylene glycol) may be mixed with the titanium dioxide pigment particles in the presence of a proportion of water at least sufficient to convert the glycol titanate by hydrolysis into the polymeric alkylene glycol titanate.

The contacting of the titanium dioxide pigment particles with the polymeric organic titanium product is preferably carried out at room temperature, but it may be carried out at a raised temperature, say up to about 100° C. The pigment particles and titanium product are mixed for a period that is at least sufficient to ensure that the titanium dioxide particles are uniformly mixed with the polymeric product. A period of mixing of about 15 minutes is usually sufficient for this purpose.

The quantity of polymeric organic titanium product with which the titanium dioxide pigment particles are contacted ranges from about 0.1 to 5 percent, and preferably from about 0.5 to 1.5 percent, calculated on the weight of the untreated particles.

The pigment particles used in this invention may comprise anatase or rutile titanium dioxide and may be pure titanium dioxide or may contain small amounts of hydrated metal oxides, for example, hydrated alumina and/or hydrated titanium dioxide, on their surfaces. Such hydrated oxides are often applied to the titanium dioxide particles to improve the dispersibility of the pigment in a paint or lacquer medium.

Dry pigment particles may be contacted with the polymeric organic titanium product. However, it is preferred to contact wet particles, for example, in the form of an aqueous paste, pulp or slurry, with the organic titanium product. The use of wet or aqueous pigment particles provides the water required for hydrolysis when a dialkyl bis-(alkylene glycol) titanate is used and the polymeric organic titanium product is formed in situ.

The process may be applied to particles obtained in the manufacture of titanium dioxide pigments by the hydrolysis of a solution of titanium sulphate or other titanium salt followed by calcination of the precipitated hydrous titanium dioxide. The manufacture includes after calcination the following steps: forming a slurry with water hydroclassification (possibly followed by surface coating with hydrated oxides and subsequent washing)

filtering to form an aqueous pulp, drying and finally milling. The process of this invention is preferably applied before the said drying operation, and is advantageously applied to the aqueous pulp obtaintd by filtration of the slurry.

The process may also be applied to pigment particles obtained by the vapor phase oxidation of titanium tetrachloride. The pigment particles so obtained, and of which the surface may or may not have been coated with at least one hydrated metal oxide as described above, may be brought into suspension in water or in an organic liquid before the process of the invention is applied thereto.

The following examples are submitted to illustrate and not to limit the invention. Throughout the specification and appended claims all parts and percentages are by weight unless otherwise indicated.

In the examples and table, the "percentage gloss" values set forth were obtained from measurements made by using air-drying acrylic resin paints containing 37% by weight of the variously treated titanium dioxide pigment samples. In obtaining the values, the following procedure was used. A beam of light was shown on a black tile at an angle of incidence of 45°. The reflectance of that beam was measured. Films of the air-drying paints, containing the variously treated pigments, were applied to sheets of cellophane. A beam of light was shown on each of those films at an angle of incidence of 45°. In each instance, the reflectance of the beam was measured.

$$\frac{\text{Reflectance of the paint film}}{\text{Reflectance of the black tile}} \times 100\% = \text{Percentage Gloss}$$

In the examples and table, the "hiding power" values set forth were obtained from measurements made on several air-drying acrylic resin paints containing 37% by weight of the various treated titanium dioxide pigment samples. The method used in obtaining the values is that described in the American Society for Testing Materials publication D 1738–60T, issued in 1960, with the substitution of Imperial gallons for U.S. gallons where appropriate. Any particular "hiding power" value represents the number of square feet of surface over which an Imperial gallon of the paint can be uniformly spread to produce a contrast ratio of C=0.98, the "contrast ratio" being defined in the ASTM publication.

In the examples and table, the "dispersibility" values were obtained in the following manner. 225 parts by weight of the variously treated pigment particles were mixed with 215 parts by weight of a linseed oil paint comprising pentaerythritol-modified alkyd resin, soya lecithin oil, and white spirits in the weight proportions of 100:20:570, respectively. During the mixing, samples of the paint were withdrawn at 1 minute intervals and tested on a Hegman gauge for fineness. The Hegman gauge reading gives a measure of the dispersion of the pigment in the medium. The rate of change of the Hegman gauge reading with time gives a measure of the rate of dispersion. After a certain time of mixing the Hegman gauge readings of the samples reach a constant maximum value. The "dispersibility" values given in the examples and table represent the specific Hegman gauge readings and the time which elapsed before the sample reached a constant maximum reading. A short period of time coupled with a high Hegman gauge reading indicates a good dispersibility and a high rate of dispersion.

Example 1

An aqueous plup containing 60% by weight of titanium dioxide pigment particles which had been subjected to a surface treatment with hydrated oxides of aluminum and titanium, was mixed with a saturated solution in perchlorethylene of the polymeric hexylene glycol titanate obtained as described in Example 3 of British patent specification No. 975,452. The proportion of the solution was such as to provide about 1% of the polymeric particles. The mixture was agitated in a paste blender for 15 minutes to insure adequate distribution of the polymeric titanate, and the resulting paste was then dried at 120° C. The dried product was milled in a fluid energy mill to yield the finished pigment.

Example 2

The procedure was the same as described in Example 1, except that the aqueous pulp was mixed with a 60% solution of a dibutyl bis-(octylene glycol) titanate. A proportion of the solution was used such as to provide about 1% of the monomeric titanate calculated on the dry weight of the pigment. The solution was prepared by adding 2 molecular proportions of 2-ethylhexan-1,3-diol to 1 molecular proportion of tetrabutyl titanate, and dissolving the resulting reaction product in butanol to give a solution of the aforesaid strength. The monomeric titanate underwent conversion to the polymeric octylene glycol titanate by the action of the water present in the pulp.

Example 3

The procedure was the same as described in Example 1, except that the aqueous pulp was mixed with a 75% solution of a dibutyl bis-(hexylene glycol) titanate in butanol. A proportion of the solution was used such as to provide about 1% of the monomeric titanate calculated on the dry weight of the pigment. The solution was prepared by adding 2 molecular proportions of 2-methylpentan-2,4-diol to 1 molecular proportion of tetrabutyl titanate. The resulting monomeric titanate dissolved in the butanol liberated during the reaction.

Example 4

An aqueous pulp, which was the same as that described in Example 1, was mixed with a 75% solution of polymeric hexylene glycol titanate in isopropanol. The solution was prepared by adding 0.5 molecular proportion of water to the reaction mixture obtained from 1 molecular proportion of tetra-isopropyl titanate and 2 molecular proportions of 3-methylpentan-2,4-diol, the monomeric titanate dissolving in the liberated isopropanol. The mixture was agitated at room temperature. The proportion of the solution was such as to provide about 1% of the polymeric titanate calculated on the dry weight of the pigment particles. The mixture was agitated in a paste blender for about 15 minutes to insure adequate distribution of the polymeric titanate and the resulting paste was then dried at 120° C. The dried product was milled in a fluid energy mill to yield the finished pigment.

Each of the pigments obtained as described in Examples 1 to 4 and a control pigment was incorporated in air-drying acrylic resin paint medium and the percentage gloss and hiding power of the paint were measured as described above. Also, the dispersibility of each pigment was measured as described above. The control pigment was prepared by drying the untreated aqueous pulp at 120° C. and milling the dried product as described in Example 1. The results are given in the table, below.

TABLE

| Pigment | Percentage gloss | Hiding power | Dispersibility | |
|---|---|---|---|---|
| | | | Hegman gauge reading | Time in minutes |
| Control | 67 | 421 | 5.0 | 2 |
| Example 1 | 78 | 450 | 7.0 | 2 |
| Example 2 | 79 | 450 | 6.0 | 3 |
| Example 3 | 75 | 450 | 6.5 | 2 |
| Example 4 | 74 | 441 | 5.0 | 2 |

As will be understood by those skilled in the art, what has been described are preferred embodiments of the invention, however, many modifications and changes can be made therein without departing from the spirit and scope of the following claims.

What is claimed is:

1. A process for treating titanium dioxide pigment particles which comprises intimately admixing titanium dioxide pigment particles with from about 0.1 to 5 percent by weight of the weight of the particles of a polymeric organic titanium product selected from the group consisting of a polymeric titanate and a dehydrated product of a polymeric titanate, the polymeric titanate having the formula

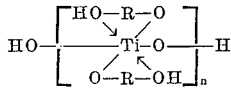

wherein $n$ is a whole number from 5 to 50 and R is an alkylene radical of an alkylene-diol having the formula

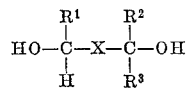

wherein $R^1$, $R^2$ and $R^3$ are independently selected from the group consisting of hydrogen and alkyl radicals and X represents an alkylene group containing from 1 to 8 carbon atoms and having a straight or branched chain, said dehydrated product having been formed by the progressive removal of up to $2n$ molecules of water with the consequent formation of a carbon-to-carbon double bond in each R radical.

2. A process as claimed in claim 1 wherein the alkylene radical represented by R has from 3 to 10 carbon atoms.

3. A process as claimed in claim 1 wherein R represents the alkylene radical of an alkylene diol selected from 2-methylpentan-2,4-diol; 3-methylpentan-2,4-diol; 2-ethylhexan-1,3-diol and 3-methylpentan-1,5-diol.

4. A composition of matter comprising titanium dioxide pigment particles which have been contacted with from about 0.1 to 5 percent by weight of the weight of the particles of a polymeric organic titanium product selected from a polymeric titanate and a dehydration product of a polymeric titanate, the polymeric titanate having the formula

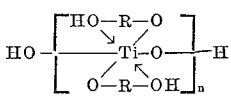

wherein $n$ is a whole number from 5 to 50 and R is an alkylene radical of an alkylene-diol of the formula

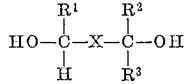

wherein $R^1$, $R^2$ and $R^3$ are independently selected from the group consisting of hydrogen and alkyl radicals and X represents an alkylene group containing 1 to 8 carbon atoms and having a straight or branched chain, said dehydrated product having been formed by the progressive removal of up to $2n$ molecules of water with the consequent formation of a carbon-to-carbon double bond in each R radical.

References Cited

UNITED STATES PATENTS

| 2,643,262 | 6/1953 | Bostwick | 260—429.5 |
| 2,824,115 | 2/1958 | Beacham et al. | 106—300 |
| 3,025,173 | 3/1962 | Bernstein | 106—300 |
| 3,071,482 | 1/1963 | Miller | 106—300 |
| 3,212,911 | 10/1965 | Bernstein et al. | 106—309 |

FOREIGN PATENTS 797,391  2/1958  Great Britain.

OTHER REFERENCES

Sidlow: "Recent Developments in Organic Derivatives of Titanium," Oil & Color Chemist Association, August 1958, vol. 41, No. 8, pp. 577–586.

TOBIAS E. LEVOW, *Primary Examiner.*

SAMUEL E. MOTT, *Assistant Examiner.*

U.S. Cl. X.R.

106—308